Patented May 9, 1950

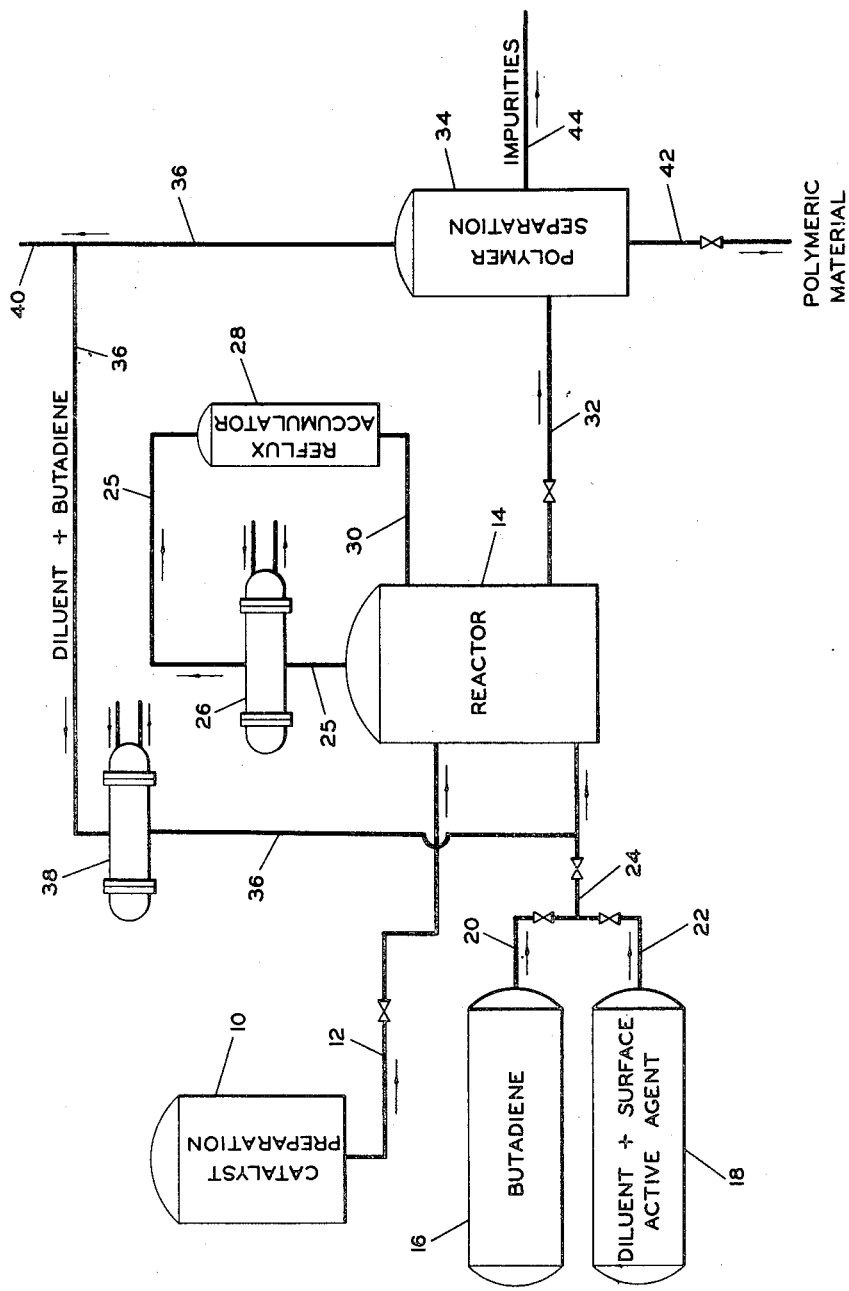

2,506,857

UNITED STATES PATENT OFFICE 2,506,857

MASS POLYMERIZATION

Willie W. Crouch, Bartlesville, Okla., assignor to Phillips Petroleum Company, a corporation of Delaware Application May 19, 1947, Serial No. 749,061

12 Claims. (Cl. 260—23.7)

The present invention relates to an improved process for the polymerization of polymerizable organic compounds. In one embodiment this invention relates to an alkali metal catalyzed mass polymerization process. One specific embodiment of this invention relates to the mass copolymerization of butadiene and styrene in the presence of an alkali metal polymerization catalyst to obtain a free flowing polymer.

While the mass polymerization of diolefins such as 1,3-butadiene, isoprene, and 2,3-dimethyl butadiene in the presence of alkali metal catalysts results in polymers of high elasticity which have many properties resembling natural gum rubber, the difficulties attendant upon this type of polymerization have retarded its development on a commercial basis. One of the most difficult problems in the alkali metal polymerization of diolefins alone or in combination with other comonomers has been the extreme stickiness of the polymer and the agglomeration of the particles as they are formed to produce masses which clog the polymerization apparatus and otherwise restrict the polymerization process. At the beginning of the polymerization vigorous agitation serves to keep the reactants in a fairly homogeneous state and the polymers are dissolved in the monomers; however as the reaction proceeds there is generally a tendency for the mixture to become viscous. In such instances the polymer agglomerates and carries with it a major portion of the dispersed catalyst thereby resulting in overpolymerization at the catalyst surface while other portions of the system remain substantially unreacted. These polymer masses are sticky and tend to deposit on the reactor surfaces and at the end of the reaction the adhering material is a tough solid mass which is very difficult to remove by mechanical means. Furthermore heat transfer is prevented as the walls of the reactor are coated and essential temperature control is rendered ineffective.

In the past, systems have been devised in attempt to overcome these difficulties in sodium catalyzed mass polymerization processes. For example, in one method rods coated with the alkali metal catalyst are dipped into the material to be polymerized and are lifted out in one mass after the polymer forms on the rods. Another method, whereby the polymerization is effected in a tube reactor equipped with a conveyer worm to force the polymer forward through the reactor, has been employed. However, disadvantages such as non-uniformity of reaction rate and polymer product, and time and power-consuming operations necessary in removing the polymers make their use impractical for large scale operation.

I have now found a method whereby the aforementioned difficulties in the mass polymerization of diolefins employing alkali metal catalysts are substantially eliminated by maintaining the polymer particles in a dispersed phase through the use of selected additive agents of a surface active nature. According to my process the polymer particles are prevented from sticking together and to the reactor by the use of alkaline earth metal salts of relatively high molecular weight fatty acids which are hydrocarbon soluble and which do not react with the alkali metal catalysts. When an inert hydrocarbon diluent is employed and a minor portion of the selected fatty acid salt such as, for example, barium stearate is added, the polymer particles are retained in a dispersed phase, and contact of unreacted monomers is maintained. The resulting formation of a free flowing slurry greatly facilitates the removal of the polymer from the reactor and also produces polymers of uniform properties and satisfactory processing characteristics. In general, surface active agents used in aqueous emulsions are unsuited to the purposes of this invention, as are all agents which are reactive with the alkali metal catalyst. The surface active agents of my invention comprise the neutral alkaline earth salts of relatively high molecular weight fatty acids, for example, those fatty acids which have at least 12 and not more than 20 carbon atoms per molecule. The salts which are preferred comprise the stearate, palmitate, linoleate and oleate of barium, calcium, strontium, and magnesium. Of these, the salts of stearic acid are to be preferred. Under certain conditions, mixtures of salts will prove to be desirable because of greater solubility in the polymerization system.

One object of the present invention is to provide a novel process for the polymerization of polymerizable organic compounds.

Another object of this invention is to provide a continuous process for the polymerization of organic materials with an alkali metal as a catalyst.

Still another object is to provide such a process for the mass copolymerization of butadiene and a monomer copolymerizable therewith by catalysis with comminuted alkali metal.

Another object is to provide such a process which is particularly suited to the mass copolymerization of butadiene and styrene.

Other objects and advantages of the presen.

invention will become apparent to those skilled in the art from the accompanying disclosure and description.

In general, my invention comprises a process for carrying out mass polymerization of diolefins or copolymerization of diolefins with other monomers such as styrene in the presence of an alkali metal catalyst, a large amount of a low boiling inert diluent, and a relatively minor proportion of a hydrocarbon soluble fatty acid salt. In a copending application, of W. A. Schulze et al., Serial No. 677,354, filed May 28, 1946, the use of low boiling diluents in mass polymerization is described and the advantages thereof set forth. The employment of my novel additive agents (surface active agents) enhances the effectiveness of the dispersion of the polymer and provides an improved process for the polymerization reactions employing a diluent, especially in large scale operation.

The mass polymerization reactions described herein are catalyzed by finely divided suspensions of alkali metals, particularly sodium and potassium. The catalyst may be prepared beforehand in convenient quantities by suspending the particles in an inert material such as paraffin wax or toluene so that a more uniform and finely divided catalyst is obtained. The fineness of the particle size of the catalyst influences significantly the polymerization process especially with regard to the uniformity of reaction rate throughout the mixture and the homogeneity of the polymer product. Dispersing agents which aid in the preparation of such catalysts may also be used if desired. Very satisfactory catalyst preparations are described in my copending applications, Serial No. 671,899, filed May 23, 1946, now Patent 2,483,886, and Serial No. 671,900, filed May 23, 1946, now Patent 2,483,887, wherein carbon black and sodium mercaptide, respectively, are employed as dispersing agents.

In the operation of my process the hydrocarbon-soluble surface active agent contained in a diluent such as isobutane is introduced simultaneously into the reactor with the catalyst suspension and a mixture containing controlled proportions of the monomers and diluent. Inlets are located at convenient points in the reactor depending upon the design of the equipment and the means of agitation employed. The reactor is usually provided with a stirring device or other agitation means, or the boiling of the diluent caused by the heat of reaction may effect sufficient contact. The reactor must be provided with suitable means for rapid removal of heat, such as water jackets or coils, as the polymerization reactions are highly exothermic.

During the polymerization process my novel additive agents function in such a way as to prevent a lumping together of the catalyst within polymer agglomerates. Thus, the activity of the catalyst is at all times made available throughout the system.

Heat transfer is also adequately controlled as the cooling system remains effective and the dispersed catalyst prevents local overheating.

After the polymerization reaction has proceeded to the desired point, the diluent and unreacted monomers are removed and the resulting polymer is washed on a wash mill. This latter treatment destroys the catalyst, substantially removes the surface active agent and leaves the polymer ready for processing.

In carrying out mass polymerization reaction of butadiene and styrene, which is one embodiment of the invention, 75 parts of butadiene and 25 parts of styrene are generally employed. However, the ratio of the monomers may be varied over a considerable range depending upon such factors as the type of polymer desired, the amount of diluent employed, the reaction conditions, etc. The metal catalysts applicable in this process are the alkali metals. For economic reasons sodium and potassium are most generally used with sodium usually preferred. The amount of polymerization catalyst may be varied within certain limits but it usually lies within the range of 0.1 to 1.0 part per 100 parts of monomers. The amount of diluent employed is an important factor since it has an appreciable effect on the polymerization rate and also serves as a heat transfer medium to control the reaction temperature. The amount of diluent may range from 50 to 400 parts or more per 100 parts of monomers with 100 to 250 parts generally preferred. The amount of surface active agent depends upon the particular substance chosen and therefore varies considerably. The solubility of the surface active agent in the diluent determines the range to a large extent. Amounts ranging from one-half part to 10 parts per 100 parts of monomers will be found suitable in most instances. The polymerization temperature is usually held within the range of about 20 to 60° C.; however, lower or higher temperatures are desirable in certain cases. A pressure sufficient to maintain liquid phase in the reaction system is generally employed in carrying out the polymerization reactions. The reaction time will vary over a wide range. Satisfactory results have been obtained employing a reaction time ranging from about 1 to about 25 hours; however, a reaction time ranging between about 8 and about 16 hours is preferable. The reaction time will vary depending upon the temperature employed, concentration of reactants, amount of catalyst and probably other factors. As used in the specification and claims of this application the term parts, unless otherwise stated, means parts by weight.

The formation of a free-flowing slurry provides an excellent basis for a continuous process for mass polymerizatiton reactions. The process as described may be adapted to a continuous system by constructing and arranging suitable apparatus for the introduction of the reactants and the removal of the polymer product at a constant rate. Provisions for the separation and recycling of the diluent and unreacted monomers either to the storage tanks or a common feed line with valves to control the feed ratios may be made in such a manner that a very satisfactory continuous operation is effected.

The process of this invention is particularly adapted to the mass copolymerization of diolefins such as 1,3-butadiene, isoprene, 2,3-dimethyl butadiene and the like with comonomers such as styrene, methyl styrene, vinyl naphthalenes, vinyl pyridines, and the like. As hereinbefore stated failure to find satisfactory means for the removal of the polymer from the reactor has to some extent prevented the development of such a process. I have shown that through the proper choice of diluent and through the use of the surface active agents described, satisfactory operation is effected and substantially homogeneous polymers of high quality are obtained. Furthermore, since my invention may comprise carrying out mass polymerization as a continuous process, much higher yields of polymer may be realized than have heretofore been possible.

The diluents suitable for use in this invention are materials such as low boiling paraffinic hydrocarbons. Isobutane is most generally used as the diluent in butadiene-styrene systems or in butadiene-comonomer systems. However, other diluents such as propane, normal butane, normal pentane and isopentane may be used.

The reaction time required to effect the desired degree of polymerization varies with the amount of diluent employed, the temperature, the effectivness of contact of the reactants with the catalyst, and the like. These factors may be satisfactorily controlled when the process described herein is employed for carrying out mass polymerization reactions.

In order to illustrate a specific embodiment of this invention, reference is made to the accompanying diagrammatic drawing.

A finely divided suspension of alkali metal catalyst from the catalyst preparation system 10 is passed through line 12 to reactor 14. Simultaneously, butadiene from storage tank 16 and an inert low-boiling diluent containing a surface active agent from storage tank 18 are fed through lines 20 and 22, respectively, into the common feed line 24 and introduced into reactor 14. In reactor 14 the mixture is maintained intimately admixed, by mixing means not shown, at a reaction temperature for a time sufficient to effect the desired extent of conversion of the monomeric materials to polymer. The heat generated by the reaction may be removed by any suitable method. In the embodiment shown reaction 14 is not maintained liquid full and a portion of the diluent is vaporized. Vaporized diluent passes through line 25, is condensed in condenser 26, collected in reflux accumulator 28 and returned to the reactor through line 30. A mixture of polymer with unreacted butadiene, inert diluent, catalyst and surface active agent is withdrawn from reactor 14 through line 32 and is introduced into the polymer separation means 34 where the diluent and butadiene are removed from the polymer material by conventional means, such as settling, filtering, distillation, and the like. The diluent and butadiene pass through line 36 and are returned to feed line 24 after condensation in condenser 38. If desired, a portion of the diluent and butadiene may be withdrawn from the system through line 40. The resulting crude polymer is treated by appropriate means, such as washing and milling, to remove impurities therefrom. The resulting finished polymeric material and the impurity containing medium are withdrawn from polymer separation means 34 through lines 42 and 44, respectively.

In this explanation reference is made to a specific monomer, namely butadiene, and also to a specific method of polymer treatment. It is to be understood, however, that variations in both materials and methods may be made without departing from the scope of the disclosure. Also, in this diagrammatic drawing, reference to some of the equipment such as pumps, gauges, and other equipment, which obviously would be necessary to actually operate the process, have been intentionally omitted. Only sufficient equipment has been shown to illustrate the process of the invention, and it is intended that no undue limitations be read into this invention by reference to the drawing and discussion thereof.

Example I

A finely divided sodium catalyst, which sufficed for all the runs, was prepared in the following manner: 32 parts by weight of sodium was charged to a reaction vessel containing 160 parts by weight of dry xylene and the contents heated to 110° C. after which stirring was started. Stirring was continued at the rate of 9,000 to 10,000 R. P. M. for twenty minutes. The system was then allowed to cool to 100° C. after which stirring was stopped. The preparation of the catalyst was carried out in an atmosphere of nitrogen to prevent oxidation of the sodium. The average particle size of the catalyst was about 0.02 millimeter.

A series of polymerization runs was made employing constant proportions of butadiene, styrene, isobutane diluent, and various selected surface active agents.

In each run, the mixture comprising reactants and diluent in the ratio of 75 parts butadiene, 25 parts styrene and 114 parts isobutane diluent was fed at a controlled rate into a polymerization reactor provided with a stirrer and a water cooled condenser. A sodium catalyst suspension prepared as described above was added in amounts of 0.30 part per 100 parts of monomers. In one of the runs no surface active agent was added and in the other runs, one of each of the following was added to the diluent in amounts of 1.1 parts of surface active agent per 100 parts of monomers: barium stearate, calcium stearate, magnesium stearate and strontium stearate. The temperature of each of these runs was held at about 50° C. Sufficient pressure was used to maintain liquid phase. The reaction was conducted over a period of 10 hours.

In the reactor in which no surface active agent was used, a solid mass of polymer was found adhering to the reactor surfaces which made removal of the product difficult, while in runs wherein alkaline earth metal salts were employed as surface active agents, the polymer was in the form of a free-flowing slurry which was readily removed from the reactor.

Example II

Two runs were made using the procedure of Example I but employing 200 parts pentane as a diluent and 0.40 part of the sodium catalyst. Strontium stearate was used as the surface active agent in amounts of 5.0 and 8.0 parts per 100 parts of monomers. Similar results were obtained and the polymer from the reactor containing strontium stearate was easily removed.

Inasmuch as the foregoing description comprises specific embodiments of the invention, it is to be understood that the invention should not be unnecessarily limited thereto and that modifications and variations may be made therein without departing substanially from the invention or from the scope of the claims.

I claim:

1. A process for the mass polymerization of a conjugated diolefin, which comprises introducing said diolefin into a reaction zone in contact with a finely divided alkali metal polymerization catalyst at a temperature maintained within the range of 20° C. to 60° C., maintaining a concentration of .05 to 1 part of said alkali metal catalyst per 100 parts of said diolefin; introducing into said reaction zone an inert diluent and a surface active agent which comprises an alkaline earth metal salt of a fatty acid, which fatty acid contains at least 12 and not more than 20 carbon atoms per molecule, maintaining the concentration of said mixture in such amounts that when said mixture is added to said reaction zone the resulting reaction mixture will contain 50 to 400 parts of inert diluent and .5 to 10 parts of said surface active agent to 100 parts of said diolefin.

2. A process for the polymerization of a conjugated diolefin, which comprises polymerizing said diolefin in the presence of a finely divided alkali metal catalyst in a reaction zone in admixture with 50 to 400 parts by weight of a low-boiling inert diluent per 100 parts by weight of said diolefin and a surface active agent in the amount of 0.5 to 10 parts by weight per 100 parts by weight of said diolefin, said surface active agent comprising an alkaline earth metal salt of a fatty acid containing at lest 12 and not more than 20 carbon atoms per molecule.

3. A process for the polymerization of a conjugated diolefin, which comprises polymerizing a conjugated diolefin having not more than 6 carbon atoms per molecule at a temperature in the range of from 20° to 60° C. in the presence of a finely divided alkali metal catalyst in a reaction zone in admixture with 50 to 400 parts by weight of a low-boiling inert diluent per 100 parts by weight of said diolefin and a surface active agent in the amount of 0.5 to 10 parts by weight per 100 parts by weight of said diolefin, said surface active agent comprising an alkaline earth metal salt of a fatty acid having at least 12 and not more than 20 carbon atoms per molecule, withdrawing a portion of a resulting reaction mixture from said reaction zone and recovering a resulting polymeric material.

4. A process as set forth in claim 3 wherein the surface active agent is an alkaline earth metal salt of oleic acid.

5. A process as set forth in claim 3 wherein the surface active agent is calcium oleate.

6. A process as set forth in claim 3 wherein the surface active agent is barium oleate.

7. A process for the polymerization of a conjugated diolefin, which comprises polymerizing said diolefin at a temperature in the range of from 20° to 60° C. in the presence of a finely divided alkali metal catalyst in a reaction in admixture with 50 to 400 parts by weight of a low-boiling inert diluent per 100 parts of said diolefin and a surface active agent in the amount of 0.5 to 10 parts by weight per part per 100 parts by weight of said diolefin, said surface active agent comprising an alkaline earth metal salt of stearic acid, withdrawing a resulting reaction mixture from said reaction zone and recovering a resulting polymeric material.

8. A process for the polymerization of a conjugated diolefin, which comprises polymerizing said diolefin at a temperature in the range of from 20° to 60° C. in the presence of a finely divided alkali metal catalyst in a reaction in admixture with 50 to 400 parts by weight of a low-boiling inert diluent per 100 parts of said diolefin and calcium stearate in the amount of 0.5 to 10 parts by weight of said diolefin as a surface active agent, recovering a resulting polymeric material as a product of the process, and recycling unreacted diolefin.

9. A process for the polymerization of butadiene, which comprises polymerizing said butadiene at a temperature in the range of from 20° to 60° C. in the presence of a finely divided alkali metal polymerization catalyst in a reaction zone in admixture with 50 to 400 parts by weight of a low-boiling inert diluent per 100 parts of said butadiene and a surface active agent in the amount of 0.5 to 10 parts by weight per 100 parts by weight of said butadiene; said surface active agent comprising an alkaline earth metal salt of a fatty acid having at least 12 and not more than 20 carbon atoms per molecule and recovering a polymeric material as a product of the process.

10. A process for the copolymerization of butadiene and styrene, which comprises copolymerizing butadiene and styrene at a temperature in the range of from 20° to 60° C. and in the presence of an alkali metal polymerization catalyst in a reaction zone in admixture with 50 to 400 parts by weight of a low-boiling inert diluent per 100 parts by weight of said butadiene and styrene and a surface active agent in the amount of from 0.5 to 10 parts by weight of said butadiene and styrene, said surface active agent comprising an alkaline earth metal salt of a fatty acid having at least 12 and not more than 20 carbon atoms per molecule, removing from said reaction zone a resulting reaction mixture and separating the polymerization product.

11. A continuous process for the mass copolymerization of monomeric materials comprising a conjugated diolefin containing not more than 6 carbon atoms per molecule and a vinyl aromatic compound, which comprises continuously copolymerizing said diolefin and said vinyl aromatic compound at a temperature in the range of 20° to 60° C. and in the presence of finely divided alkali metal polymerization catalyst in a reaction zone in admixture with 50 to 400 parts by weight of an inert diluent per 100 parts of said monomeric materials and a surface active agent in the amount of 0.5 to 10 parts by weight per 100 parts by weight of said monomeric materials, said surface active agent comprising an alkaline earth metal salt of a fatty acid having at least 12 and not more than 20 carbon atoms per molecule, continuously withdrawing a resulting diolefin-vinyl aromatic compound polymer reaction mixture, recovering a resulting copolymer and recycling unreacted monomeric materials.

12. In a process for polymerization of a conjugated diolefin in the presence of a finely divided alkali metal polymerization catalyst to produce a solid elastic polymer, the improvement which comprises passing through a polymerization zone a solution of said diolefin in 50 to 400 parts by weight of a low-boiling inert solvent per 100 parts by weight of said diolefin, said solution also containing as a dispersing agent an alkaline earth metal salt of a fatty acid containing at least 12 and not more than 20 carbon atoms per molecule, said dispersing agent being present in the amount of from 0.5 to 10 parts by weight per 100 parts by weight of said diolefin and removing from said polymerization zone a resulting free-flowing slurry of a resulting polymer in said inert solvent.

WILLIE W. CROUCH.

REFERENCES CITED

The following references are of record in the file of this patent:

FOREIGN PATENTS

| Number | Country | Date |
| --- | --- | --- |
| 532,455 | Germany | Aug. 28, 1931 |

OTHER REFERENCES

Tschajanov: Supplement to "Journal of Society of Chemical Industry," March 13, 1936, page 229.